United States Patent [19]
Aderhold

[11] Patent Number: 5,679,272
[45] Date of Patent: Oct. 21, 1997

[54] METHOD OF WELDING CONTAINERS AND APPARATUS THEREFOR

[75] Inventor: Harry Aderhold, Berikon, Switzerland

[73] Assignee: Elpatronic AG, Zug, Switzerland

[21] Appl. No.: 587,018

[22] Filed: Jan. 16, 1996

[30] Foreign Application Priority Data

Feb. 24, 1995 [CH] Switzerland ................ 538/95

[51] Int. Cl.$^6$ ................................. B23K 11/06
[52] U.S. Cl. .................. 219/64; 219/61.5; 219/83
[58] Field of Search ................... 219/59.1, 61.5, 219/64, 79, 81, 83, 84

[56] References Cited

U.S. PATENT DOCUMENTS

| | | | |
|---|---|---|---|
| 3,743,813 | 7/1973 | Opprecht | 219/67 |
| 3,745,295 | 7/1973 | Opprecht | 219/64 |
| 4,144,440 | 3/1979 | Schalch et al. | 219/61.5 |
| 4,399,343 | 8/1983 | Müller et al. | 219/64 |
| 4,700,037 | 10/1987 | Weil | 219/64 |

FOREIGN PATENT DOCUMENTS 0 189 805  8/1987  European Pat. Off. ........ B23K 37/04

OTHER PUBLICATIONS

Abstract from "Designing and Manufacturing of Jigs" by Yung-Bin Chen, published by Shi-Yo Industrial Book Company, 1974.
Abstract from "Welding" by Lin-San Chang, published by Cheng-Wen Book Co., 1993.
Abstract from "Introduction to Automation" by Chung-Shin Chang, published by Chun-Hua Book Co., 1995.
Pp. 342-343 from "Ingenious Mechanisms", vol. 2, 1980.
Pp. 380-381 from "Ingenious Mechanisms", vol. 3.

*Primary Examiner*—Teresa J. Walberg
*Assistant Examiner*—J. Pelham
*Attorney, Agent, or Firm*—McCormick, Paulding & Huber

[57] ABSTRACT

When welding a series of container bodies, the welding speed is at first increased to prevent the first body from colliding with the second body at the intake to the welding machine. The welding speed is then reduced to a rated welding speed $V_s$ at which minimum gaps are maintained between successive bodies.

11 Claims, 2 Drawing Sheets

METHOD OF WELDING CONTAINERS AND APPARATUS THEREFOR

BACKGROUND OF THE INVENTION

The invention relates to a method of welding the longitudinal seam of container bodies. The invention also relates to a welding machine for welding a series of container bodies.

For the welding of containers, particularly three-part cans, the container bodies which are to be welded are fed in succession by a feed arrangement to the intake to the welding machine. Welding is performed by a resistance roller seam welding machine with wire electrodes—a type of machine which is known, and need not be described in detail here.

Whenever welding is restarted following an interruption on the welding line, which normally includes a destacker for the container blanks and a rounding unit to form the container body, as well as the feed arrangement and welding machine which have already been mentioned, together with corresponding conveying and handling means, and is therefore subject to fairly frequent interruptions in operation, the problem arises that, as the first container body of the incoming series of bodies runs into the calibrating tool of the welding machine, it is braked, as there are cupping guides and/or pressure rollers which are non-driven and therefore have to be accelerated by the first can.

To prevent any collision between the first container body and the next container body as a result of this braking of the first body, it is a known procedure to convey the can bodies at the entry to the welding machine (and to weld them) at a speed which is consistently higher than their rate of feed, so that even when braking of the first body occurs, collision with the second body is reliably prevented. The result is that, during welding, the gap between the first body and the second, although large enough to prevent collision, is small, and the gap between the second body and the third, and between the third and fourth, etc., is relatively large, because these bodies are being drawn into the welding machine faster than they are being fed, they are hitting idling rollers which have already been accelerated by the first body, and they are not subject to any braking action.

The resulting gap between the bodies coming after the first body amounts to eg. approximately 0.8 mm to 1 mm. Such a gap between successive bodies is large enough to cause problems of weld quality at the start of each body seam. Overwelding at the end of the body and vibration of the welding rollers may also occur. For containers, this may result in lack of strength, or even leaks. Hence the procedure according to the state of the art consists in operating at a high and constant intake and welding speed which significantly exceeds the rate of feed, in order that collision problems may reliably be avoided, but as a result there is a large gap at the welding stage which may cause problems of weld quality.

It is a basic object of the invention to provide an improved process in which both collision problems and weld quality problems are ameliorated or avoided.

SUMMARY OF THE INVENTION

The problems which have been described are solved through a departure from the constant-speed operation of the welding machine adopted hitherto. By increasing the speed of the welding machine and the rate of feed of the wire at initial start-up and following every interruption of operation, collision between the first and second can bodies can reliably be prevented. By then slowing to a lower rated speed, very small gaps between the can bodies can be obtained. In other words, the welding wire is accelerated before the first body of a given series is welded. The first body is thus welded at a higher speed than subsequent bodies.

Preferably the welding speed is reduced so that it is essentially equal to the rate of feed of the can bodies. The gaps between the bodies are preferably set to a distance of approximately 0.3 mm.

It is a further object to provide a welding machine in which the abovementioned drawbacks do not arise or have less effect. This object is attained, in a welding machine of the abovestated kind and which has a variable speed drive.

By making it possible to reduce the welding speed of the machine on the basis of a signal from a can body detector, the machine can be operated at a higher speed upon start-up, thus solving the problem of collision between the first and second bodies. The lower speed which is then set by the can body detector yields the more favourable smaller gap between can bodies.

BRIEF DESCRIPTION OF THE DRAWINGS

The invention will now be described in detail with reference to the drawings, in which.

DESCRIPTION OF THE PREFERRED EMBODIMENTS

Figure 1:
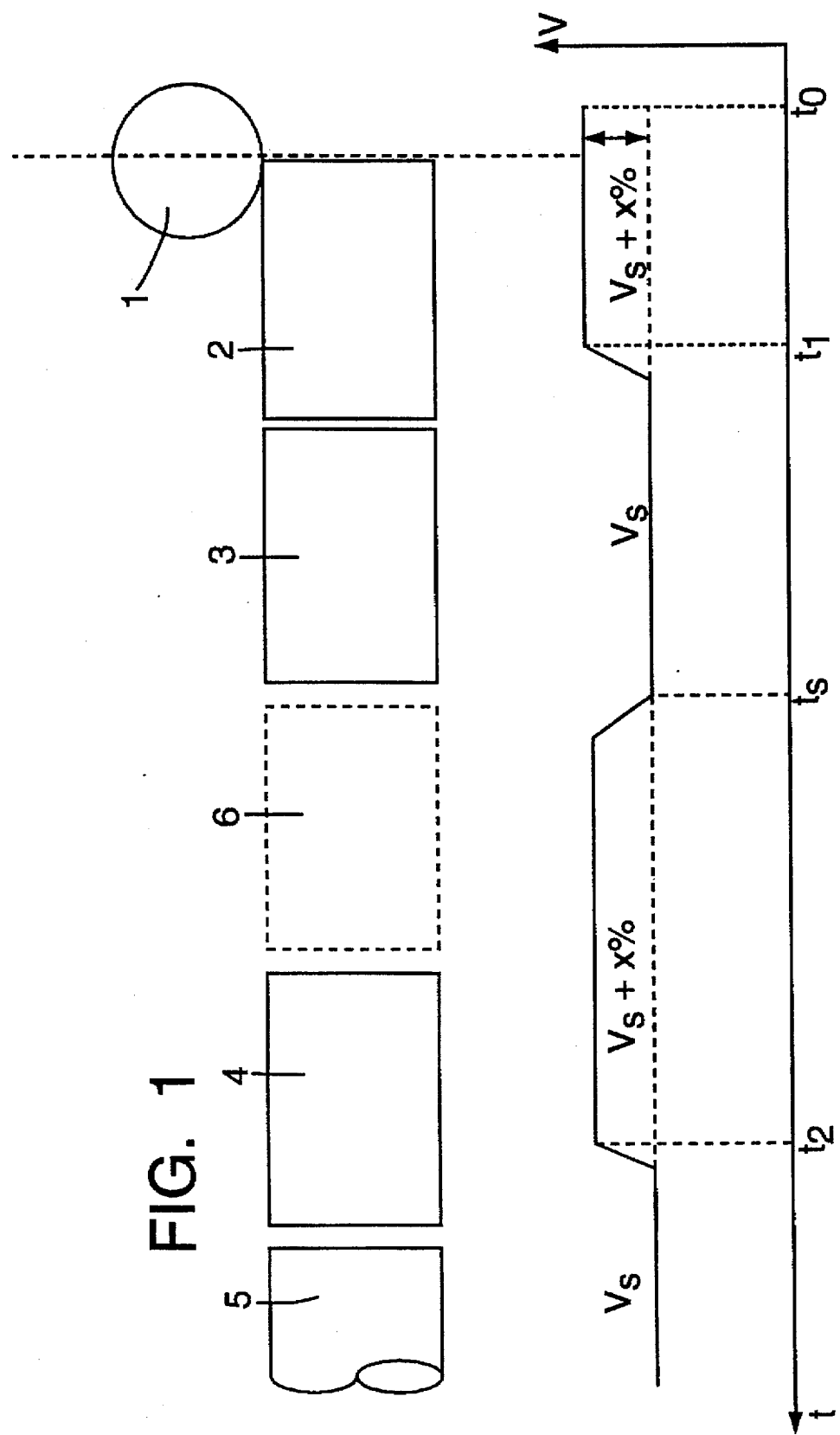
FIG. 1 shows diagrammatically the velocity curve of a welding machine according to the invention, plotted over time.

Part of FIG. 1 shows a diagram of welding speed against time, in which the vertical axis represents the welding speed V of the welding machine, or of the welding rollers in the case of a roller seam welding machine. Any pressure rollers and/or guide rollers which are driven also run at this speed, while the idling rollers are initially stationary, and are driven only by the can bodies as they pass through. The horizontal axis shows time t. Above the V/t diagram, a welding roller 1 of the welding machine and a series of can bodies 2, 3, 4, 5 are schematically depicted. Upon start-up ($t_o$), a speed $V_s+X$ % is set which is higher than the rated welding speed $V_s$. In the case of a Type MWM 6200 Welding Machine made by the firm of Soudronic AG, Bergdietikon, Switzerland, the rated speed may be eg. 130.6 m/min when welding can bodies 73 mm in diameter and 230 mm long in sheet metal with a thickness of 0.17 mm, a hardness of DR550 and a tin-plating of D2.79/5.83 g/m$^2$, with a welding force of 500N and a welding current of 5500 A at 1000 Hz sinusoidal. At the start of the can body series, ie. upon initial start-up $t_o$ and upon restart $t_s$ after every break in operation, the drive is operated at the increased speed of $V_s+X$ %, which is 1 to 5% higher than the rated welding speed, hence eg. 130.6 m/min+2%=133.2 m/min.

This increased speed is applied from start-up and becomes effective from the intake of the first can body of the series into the machine, and it ensures that this body, which is slowed on encountering the (stationary) idle pressure rollers and guide rollers present, is drawn into the machine at a higher speed than the ensuing second body of the series being supplied by a feed unit for the bodies to be welded. The first body, which is drawn in at a high speed, is therefore clear of the intake zone when the second body enters this zone. Once the first body has arrived at a predetermined distance from the welding rollers in the calibrating tool, eg. at time $t_1$, the welding machine drive is slowed down to the rated speed $V_s$.

The sensor used to detect the first body may be eg. an optical, magnetic or inductive sensor. Such sensors are commercially available: for example, an IFRW 12P1501/S14L Proximity Switch made by the firm of Baumerelectric, Frauenfeld, Switzerland may be used. The welding machine drive may be influenced mechanically or pneumatically by adjusting a variable speed drive, or electrically by corresponding control of the electric motor of the drive.

The speed $V_s$ is then maintained until an interruption 6 occurs eg. due to the presence of a double body blank.

The speed is then increased again to $V_s+X$ % for the welding of the next leading body 4. For the following body 5, the speed is reduced again ($t_2$). The rate of feed of the feed unit for the can bodies can be matched to this rated speed to yield a small body gap of eg. 0.2 to 0.6 mm, and preferably approximately 0.3 mm. With a body gap of 0.3 mm, the energy input into the last weld point is practically the same as into the points along the seam, and underwelding at the initial points at the start of the body is slight. Excitation of vibration due to the space between the bodies is also greatly reduced, so that the input of welding energy at the start of the body becomes much more constant.

With body gaps of more than 0.8 mm, the last point is significantly overwelded by approximately 10%, while the first points are underwelded by up to 20%. There are relatively strong fluctuations in energy due to mechanical vibration.

After every interruption in operation, the welding speed is again increased to the higher speed until the first body of the series concerned approaches the welding rollers. From then on, welding is performed at rated speed. The rated speed may be essentially equal to the rate of feed if the bodies are already being fed by the feed unit at the desired interval. Possible forms of feed unit (known in themselves) are chain conveyors or belt conveyors with pusher dogs.

Figure 2:
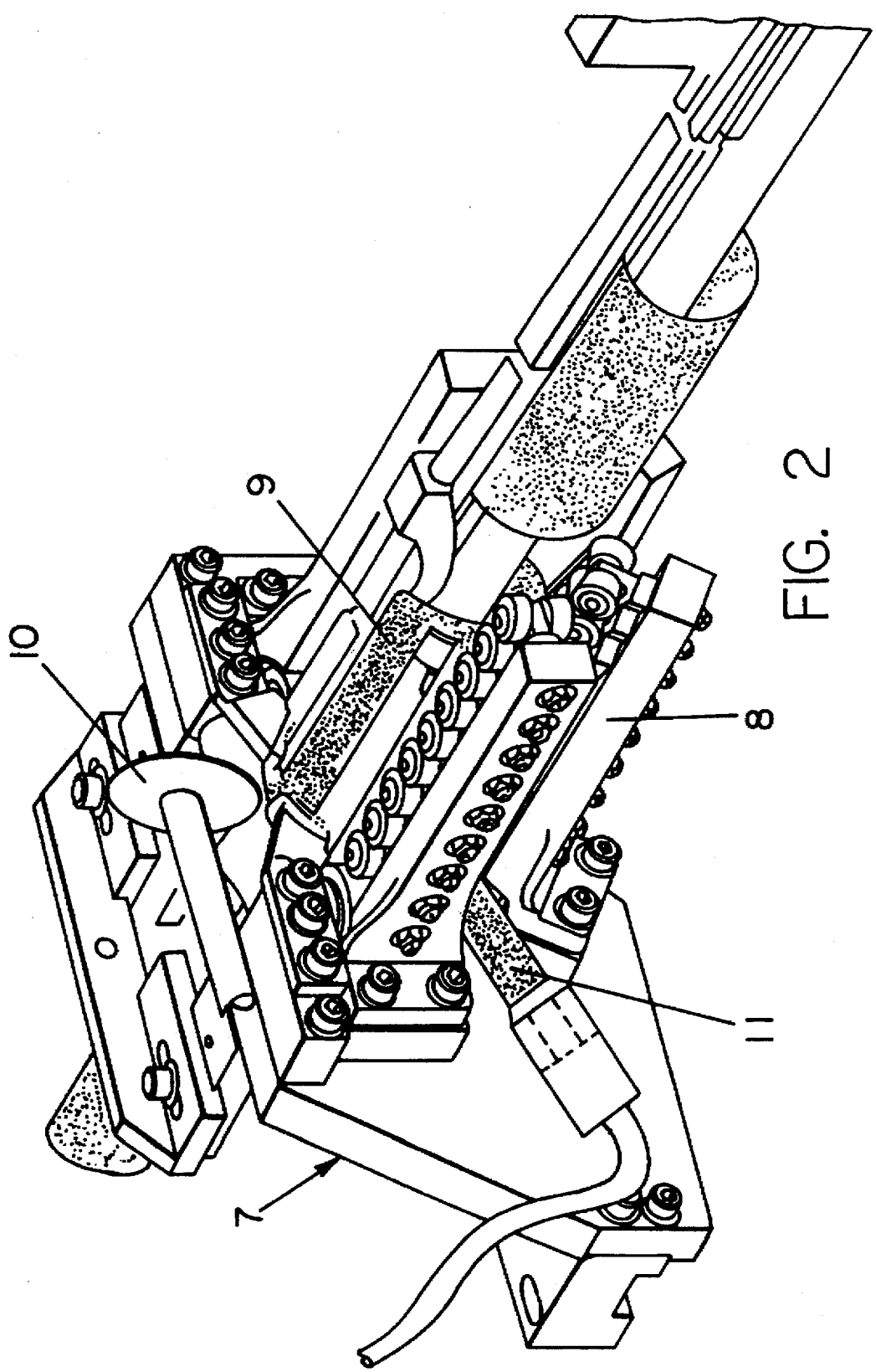
FIG. 2 shows schematically the intake region of a welding machine.

FIG. 2 shows schematically the intake region of a welding machine 7 with calibrating tool 8. A welding roller 10 (without its wire electrode) is shown schematically above the can body 9 to be welded. The proximity switch 11, which projects into the calibrating tool, detects the presence of a can body.

I claim:

1. Method of operating a welding machine for welding the longitudinal seams of a series of container bodies which includes the steps of:

feeding the series of bodies over idling rollers and between welding rollers of the welding machine; and welding the bodies at a predetermined, rated welding speed using the welding rollers of the welding machine; wherein the improvement comprises:

setting the welding speed to a start-up welding speed greater than the rated welding speed as the first body of a given series of bodies enters the welding machine and is fed over the idling rollers, and then reducing the welding speed back to the rated welding speed as the first body enters the welding rollers.

2. Method according to claim 1, wherein the step of reducing the welding speed starts as the first body of the series is within the idling rollers.

3. Method according to claim 1, wherein the gap between the second and third bodies and the subsequent gaps between bodies in the series all lie between 0.1 mm and 0.6 mm.

4. Method according to claim 1, in which the welding machine forms part of a welding line with destacker, a rounding unit, and a feed unit from the rounding unit to the intake to the welding machine, wherein the rated welding speed is essentially equal to the rate of feed and the bodies are fed at a predetermined interval.

5. A resistance roller seam welding machine for welding a series of container bodies, comprising:

a set of idling rollers for guiding container bodies;

welding rollers downstream from the idling rollers and having wire electrodes for welding a series of container bodies;

a variable speed drive for feeding container bodies to the idling rollers and the welding rollers, the variable speed drive feeding the container bodies at a predetermined start-up welding speed at the beginning of welding; and a container body detector for detection of a first body of the series of bodies in advance of the welding rollers, wherein the variable speed drive reduces the speed at which the variable speed drive feeds bodies from the start-up welding speed to a rated welding speed upon detection of the first body by the detector.

6. Welding machine according to claim 5, wherein the detector is provided in the region of idling rollers located ahead of the welding rollers.

7. Welding machine according to claim 5, characterized in that the variable speed drive includes a mechanical variable speed drive for the welding speed, and the detector acts on the mechanical variable speed drive.

8. Welding machine according to claim 5, characterized in that the variable speed drive includes an electronically controlled servo drive, and the detector acts on the electronically controlled servo drive.

9. Welding machine according to claim 5, wherein the idling rollers are guide rollers.

10. Welding machine according to claim 5, wherein the idling rollers are pressure rollers.

11. Method according to claim 3, wherein the subsequent gaps are approximately 0.3 mm.

* * * * *